(12) United States Patent
Henry et al.

(10) Patent No.: US 8,443,175 B2
(45) Date of Patent: May 14, 2013

(54) MICROPROCESSOR WITH FIRST PROCESSOR FOR DEBUGGING SECOND PROCESSOR

(75) Inventors: G. Glenn Henry, Austin, TX (US); Jui-Shuan Chen, Austin, TX (US)

(73) Assignee: VIA Technologies, Inc., New Taipei (TW)

( * ) Notice: Subject to any disclaimer, the term of this patent is extended or adjusted under 35 U.S.C. 154(b) by 644 days.

(21) Appl. No.: 12/748,753

(22) Filed: Mar. 29, 2010

(65) Prior Publication Data

US 2011/0010530 A1    Jan. 13, 2011

Related U.S. Application Data

(60) Provisional application No. 61/224,784, filed on Jul. 10, 2009, provisional application No. 61/297,513, filed on Jan. 22, 2010.

(51) Int. Cl.
| | |
|---|---|
| G06F 15/00 | (2006.01) |
| G06F 15/76 | (2006.01) |
| G06F 9/44 | (2006.01) |
| G06F 9/00 | (2006.01) |
| G06F 7/38 | (2006.01) |
| G06F 11/00 | (2006.01) |

(52) U.S. Cl.
USPC ............. 712/227; 712/28; 712/29; 712/30; 712/31; 714/45; 714/30

(58) Field of Classification Search ............ None
See application file for complete search history.

(56) References Cited

U.S. PATENT DOCUMENTS

| | | | |
|---|---|---|---|
| 6,438,709 B2 | 8/2002 | Poisner | |
| 6,457,073 B2 | 9/2002 | Barry et al. | |
| 6,463,529 B1 | 10/2002 | Miller et al. | |
| 6,643,796 B1 | 11/2003 | Floyd et al. | |
| 6,687,865 B1 * | 2/2004 | Dervisoglu et al. | 714/726 |
| 6,728,904 B2 | 4/2004 | Kanekawa et al. | |
| 7,013,398 B2 | 3/2006 | Zhao | |
| 2001/0042198 A1 | 11/2001 | Poisner | |
| 2002/0062480 A1 | 5/2002 | Kirisawa | |
| 2002/0129309 A1 * | 9/2002 | Floyd et al. | 714/724 |
| 2003/0014264 A1 | 1/2003 | Fujii et al. | |

(Continued)

FOREIGN PATENT DOCUMENTS

| | | |
|---|---|---|
| CN | 101000596 | 7/2007 |
| JP | 62256298 | 11/1987 |

*Primary Examiner* — Andrew Caldwell
*Assistant Examiner* — William B Partridge
(74) *Attorney, Agent, or Firm* — E. Alan Davis; James W. Huffman

(57) ABSTRACT

A microprocessor integrated circuit includes first and second processors, an internal memory accessible by the first and second processors, and a bus interface unit configured to interface to a bus external to the microprocessor for providing access to a memory external to the microprocessor. The bus interface unit, external bus, and external memory are accessible by the second processor but are inaccessible by the first processor. The first processor writes debug information to the internal memory. The first processor detects an event and provides a notification of the event to the second processor. The second processor, coupled to the bus interface unit, executes microcode in response to the event notification received from the first processor. The microcode reads the debug information from the internal memory and writes the debug information to the external memory via the bus interface unit and external bus for use in debugging the second processor.

30 Claims, 4 Drawing Sheets

U.S. PATENT DOCUMENTS

| | | | |
|---|---|---|---|
| 2003/0056154 A1* | 3/2003 | Edwards et al. | 714/45 |
| 2004/0221196 A1 | 11/2004 | Datta et al. | |
| 2007/0180315 A1 | 8/2007 | Aizawa | |
| 2007/0209072 A1 | 9/2007 | Chen | |
| 2007/0214341 A1* | 9/2007 | Das | 712/38 |
| 2008/0016405 A1 | 1/2008 | Kitahara | |
| 2008/0126877 A1* | 5/2008 | Alsup | 714/45 |
| 2008/0184055 A1* | 7/2008 | Moyer et al. | 713/502 |
| 2009/0313507 A1* | 12/2009 | Swaine et al. | 714/38 |
| 2009/0313623 A1* | 12/2009 | Coskun et al. | 718/100 |
| 2010/0064173 A1* | 3/2010 | Pedersen et al. | 714/30 |
| 2011/0010531 A1 | 1/2011 | Henry et al. | |
| 2011/0053649 A1 | 3/2011 | Wilson | |
| 2011/0143809 A1 | 6/2011 | Salomone et al. | |
| 2011/0185153 A1 | 7/2011 | Henry et al. | |
| 2011/0185160 A1 | 7/2011 | Gaskins et al. | |
| 2011/0202796 A1 | 8/2011 | Henry et al. | |
| 2012/0185681 A1 | 7/2012 | Henry et al. | |

* cited by examiner

MICROPROCESSOR WITH FIRST PROCESSOR FOR DEBUGGING SECOND PROCESSOR

CROSS REFERENCE TO RELATED APPLICATION(S)

This application claims priority based on the following U.S. Provisional Applications, each of which is hereby incorporated by reference in its entirety:

| Ser. No. | Filing Date | Title |
| --- | --- | --- |
| 61/224,784 | Jul. 10, 2009 | MICROPROCESSOR WITH INTEROPERABILITY BETWEEN SERVICE PROCESSOR AND MICROCODE-BASED TRACER |
| 61/297,513 | Jan. 22, 2010 | MICROPROCESSOR WITH INTERNAL MEMORY FOR STORING DEBUG INFORMATION UNTIL SYSTEM MEMORY IS ACCESSIBLE |

This application is related to U.S. Non-Provisional application Ser. No. 12/748,846, filed concurrently herewith, entitled DEBUGGABLE MICROPROCESSOR, which is incorporated by reference herein in its entirety, and which is subject to an obligation of assignment to common assignee VIA Technologies, Inc.

FIELD OF THE INVENTION

The present invention relates in general to the field of debugging and performance tuning of a microprocessor, and particularly to the use of a service processor for same.

BACKGROUND OF THE INVENTION

A processor includes a set of microcode routines that lie dormant until activated by a software write to a control register (e.g., WRMSR instruction). The set of microcode routines is referred to herein as "tracer," which is used as a tool to debug and performance tune the processor. Once activated, various events can trigger the tracer to gather processor state information and write it to specified addresses in memory so that it can be captured by a logic analyzer monitoring the external processor bus. The state information can include the contents of the register sets; translation-lookaside buffers; cache memories, such as data caches, instruction caches, branch target address caches, level-2 caches; a private random access memory (RAM) (described in U.S. patent application Ser. No. 12/034,503, filed Feb. 20, 2008, which claims priority to U.S. Provisional Application 60/910,982, filed Apr. 10, 2007, each of which is hereby incorporated by reference in its entirety for all purposes) of the processor 102; and so forth. The state information and other information associated with it (e.g., time information) is referred to herein as log information, or simply a log. The events can also trigger tracer to perform other actions, such as clearing various state (e.g., write-back invalidate caches, clear translation lookaside buffers (TLBs), least-recently-used (LRU) arrays, branch prediction information), or causing the processor to take an system management interrupt (SMI) to a private system management mode (SMM) address allocated for tracer. Event examples include: execution of a specified instruction, such as RDTSC, RDPMC, XSTORE (store random numbers), MOV to CR (control register), WRMSR, RDMSR, software interrupt instructions, SYSENTER/SYSEXIT/SYSCALL/SYSRET, CPUID, RSM, MWAIT, MONITOR, VMLAUNCH, VMRESUME, IRET, IN, OUT); an x86 exception; interrupts, such as SMI, INTR, NMI, STPCLK, A20; virtual machine (VM) exit condition; machine check; and read/write an Advanced Programmable Interrupt Controller (APIC) register.

Tracer is a very powerful tool; however, it has two main limitations. First, tracer is implemented as microcode instructions within the processor; consequently, by executing tracer, the state of the processor changes from what the processor state would be without tracer having been activated and triggered. That is, tracer may be disruptive to the normal processor state that is created by the program being debugged or tuned, which may reduce tracer's usefulness. For example, tracer may make the bug go away or may affect the performance of the processor. Second, because tracer is a set of microcode routines, the tracer routines can only run when the processor is executing microcode-implemented instructions or if a hardware interrupt causes the processor to go to microcode; however, there are events that are important to debugging or tuning that can occur asynchronously to the execution of instructions, i.e., during the midst of the execution of an instruction, some of which may take many clock cycles to execute, during which the tracer microcode does not get to run. For example, the processor voltage or bus clock ratio may change at any time regardless of which instructions the processor is currently executing and may occur at any time during the execution of an instruction or set of instructions.

BRIEF SUMMARY OF INVENTION

In one aspect the present invention provides a microprocessor integrated circuit. The microprocessor integrated circuit includes first and second processors, an internal memory accessible by the first and second processors, and a bus interface unit configured to interface to a bus external to the microprocessor for providing access to a memory external to the microprocessor. The bus interface unit, external bus, and external memory are accessible by the second processor but are inaccessible by the first processor. The first processor is configured to write debug information to the internal memory. The first processor is further configured to detect an event and to provide a notification of the event to the second processor. The second processor is coupled to the bus interface unit and is configured to execute microcode in response to the event notification received from the first processor. The microcode is configured to read the debug information from the internal memory and to write the debug information to the external memory via the bus interface unit and external bus for use in debugging the second processor.

In another aspect, the present invention provides a method for debugging a microprocessor integrated circuit comprising first and second processors and an internal memory accessible by the first and second processors, the microprocessor integrated circuit being coupled to an external memory by an external bus. The method includes the first processor writing debug information to the internal memory. The method also includes the first processor detecting an event and providing a notification of the event to the second processor. The method also includes the second processor executing microcode in response to the event notification received from the first processor. The method also includes the microcode reading the debug information from the internal memory and writing it to the external memory for use in debugging the second processor. The writing the debug information to the external memory comprises causing a bus interface unit, coupled to the second processor, to write the debug information on the external bus to the external memory, wherein the bus interface unit, external bus, and external memory are inaccessible by the first processor.

In yet another aspect, the present invention provides a computer program product for use with a computing device, the computer program product comprising a computer usable storage medium having computer readable program code embodied in said medium for specifying a microprocessor integrated circuit. The computer readable program code includes first program code for specifying first and second processors. The computer readable program code also includes second program code for specifying an internal memory accessible by the first and second processors. The computer readable program code also includes third program code for specifying a bus interface unit configured to interface to a bus external to the microprocessor for providing access to a memory external to the microprocessor, wherein the bus interface unit, external bus, and external memory are accessible by the second processor but are inaccessible by the first processor. The first processor is configured to write debug information to the internal memory. The first processor is further configured to detect an event and to provide a notification of the event to the second processor. The second processor is coupled to the bus interface unit and is configured to execute microcode in response to the event notification received from the first processor. The microcode is configured to read the debug information from the internal memory and to write the debug information to the external memory via the bus interface unit and external bus for use in debugging the second processor.

DETAILED DESCRIPTION OF THE INVENTION

Figure 1:
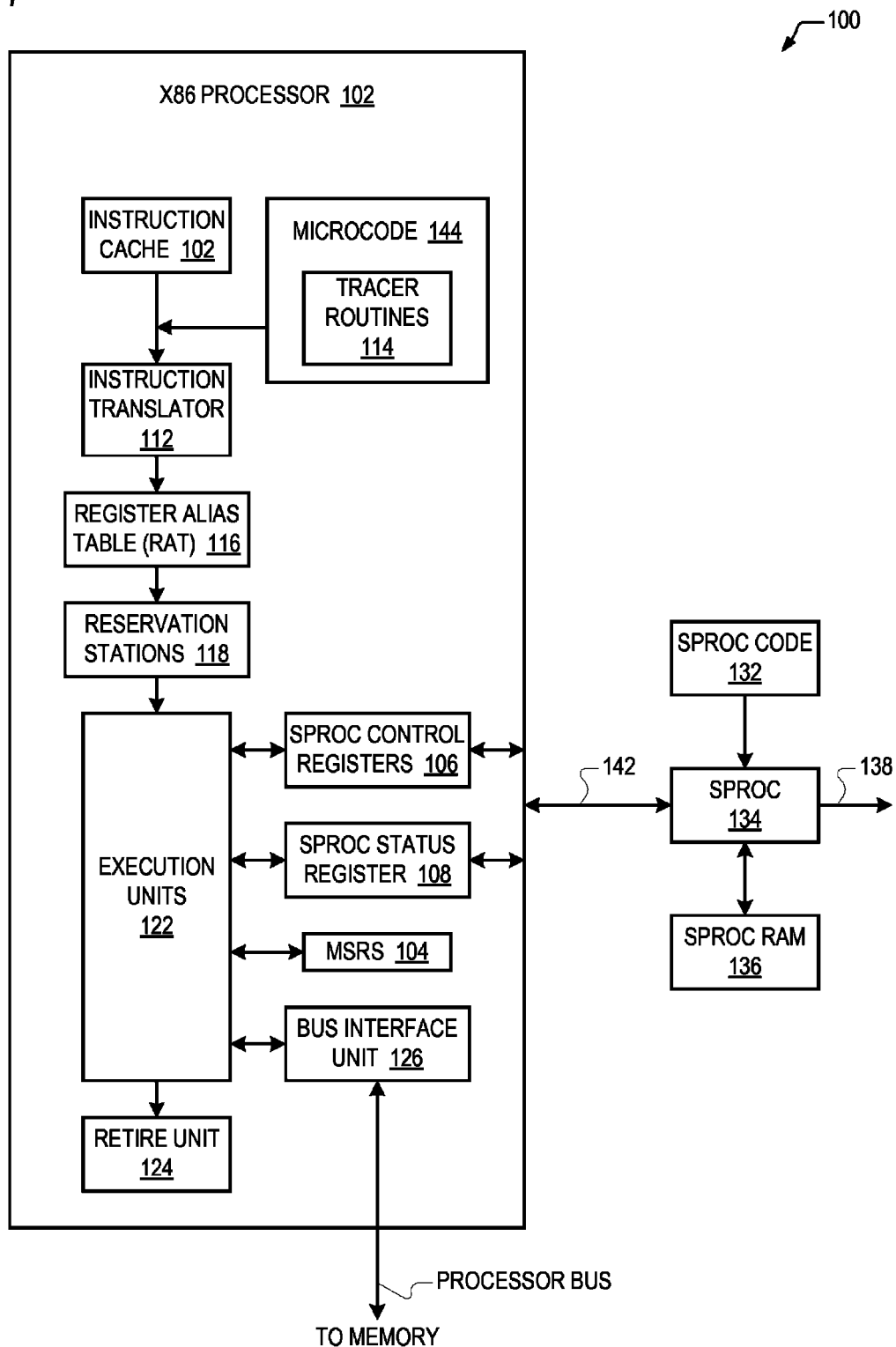
FIG. 1 is a block diagram of a microprocessor integrated circuit.

Referring now to FIG. 1, a block diagram of a microprocessor integrated circuit 100 is shown. The microprocessor 100 includes a service processor (SPROC) 134 in addition to the main processor 102. The term "main processor" or "processor" or "microprocessor" used herein refers to the non-service processor 134 portion of the integrated circuit 100. In one embodiment, the main processor 102 is an x86 (also referred to as IA-32) architecture processor 102; however, other processor architectures may be employed. A processor is an x86 architecture processor if it can correctly execute a majority of the application programs that are designed to be executed on an x86 processor. An application program is correctly executed if its expected results are obtained. In particular, the main processor 102 executes instructions of the x86 instruction set and includes the x86 user-visible register set.

The main processor 102 includes an instruction cache 102 and a microcode unit 144, each of which provides instructions to an instruction translator 112. The microcode 144 includes the tracer routines 114. The instruction translator 112 translates the received instructions into microinstructions. The instruction translator 112 may invoke the microcode 144, such as a tracer routine 114, in response to decoding one of a predetermined set of instructions of the instruction set architecture of the main processor 102. The instruction translator 112 provides the microinstructions to a register alias table (RAT) 116 that generates instruction dependencies and maintains a table thereof.

The main processor 102 also includes a plurality of execution units 122 that execute the microinstructions. Reservation stations 118 associated with the execution units 122 hold microinstructions waiting to be issued to the execution units 122 for execution. The RAT 116 receives the microinstructions in program order and may dispatch them to the reservation stations 118 out of program order subject to the dependencies. A retire unit 124 retires the instructions in program order.

The main processor 102 also includes a bus interface unit 126 that interfaces the main processor 102 to a processor bus that couples the main processor 102 to the rest of the system, such as to memory and/or a chipset.

The main processor 102 also includes model specific registers (MSR) 104. The MSRs 104 are user-programmable. Specifically, a user may program the MSRs 104 to control tracer 114 operation.

The main processor 102 also includes SPROC control registers 106 and an SPROC status register 108, coupled to the execution units 122, whose use will be described in more detail below. The SPROC control registers 106 and SPROC status register 108 are coupled to the SPROC 134 via a bus 142.

There are asynchronous events that can occur with which the tracer microcode 114 cannot deal well. However, advantageously, the SPROC 134 can be commanded by the processor 102 to detect the events and to perform actions (discussed below, such as creating a log itself) in response to detecting the events. The SPROC 134 can itself provide the log information to the user, and it can also interact with the tracer 114 to request the tracer 114 to provide the log information or to request the tracer 114 to perform other actions, as discussed below. Examples of the events that SPROC 134 can detect include:

1. The processor 102 is hung. That is, the processor 102 has not retired any instructions for a number of clock cycles that is programmable via an MSR 104. In one embodiment, the processor 102 includes a counter that is loaded with the MSR 104 value each time the processor 102 retires an instruction; otherwise, the counter counts up every clock cycle. If the counter overflows, hardware within the processor 102 sets a bit within the SPROC status register 108 (discussed below) to indicate a processor 102 hung event. This is particularly useful in determining which instruction was executing when the processor 102 hung.
2. The processor 102 loads data from an uncacheable region of memory. In one embodiment, the memory subsystem hardware sets the corresponding bit within the SPROC status register 108.
3. A change in temperature of the processor 102 occurs. In one embodiment, the temperature change is indicated by a temperature sensor included within the integrated circuit 100.
4. The operating system requests a change in the processor's 102 bus clock ratio, which changes the internal clock frequency of the processor 102, and/or requests a change in the processor's 102 voltage level. In one embodiment, microcode that services the operating system request sets the corresponding bit within the SPROC status register 108.

5. The processor 102, of its own accord, changes the voltage level and/or bus clock ratio, e.g., to achieve power savings or performance improvement.
6. An internal timer of the processor 102 expires.
7. A cache snoop that hits a modified cache line causing the cache line to be written back to memory occurs. One method used to debug the processor 102 is to compare the tracer 114 log information with the execution results of a software functional model simulator that simulates the processor 102. In order to simulate the operation of the processor 102 in response to an external event, such as the generation of a cache snoop request by the chipset, the simulator must be told about the external event. Thus, it is advantageous that SPROC 134/tracer 114 detect and log the event and when it occurred in the actual operation of the processor 102 because it enables the debugger to provide the time of the occurrence of the hit-modifying snoop to the simulator to aid in debugging.
8. The temperature, voltage, or bus clock ratio of the processor 102 goes outside a respective range that may be programmed via an MSR 104.
9. An external trigger signal is asserted by a user on an external pin of the integrated circuit 100.

Advantageously, because the SPROC 134 is running code 132 independently of the main processor 102, it does not have the same limitations as the tracer 114 microcode. Thus, it can detect or be notified of the events independent of the processor 102 instruction execution boundaries and without disrupting the state of the processor 102.

As shown in FIG. 1, the SPROC 134 has its own code 132 that it executes, its own RAM 136 for storing log information, and its own serial port interface (SPI) 138 through which it can transmit the log to an external device. Advantageously, the SPROC 134 can also instruct tracer 114 running on the main processor 102 to store the log information from the SPROC RAM 136 to system memory, as discussed in more detail below.

The SPROC 134 communicates with the processor 102 via the SPROC status register 108 and SPROC control registers 106 and via the bus 142 that enables commands to be sent and received between SPROC 134 and the processor 102. The SPROC status register 108 includes a bit corresponding to each of the events described above that the SPROC 134 can detect. To notify the SPROC 134 of an event, the processor 102 sets the bit in the SPROC status register 108 corresponding to that event. Some of the event bits are set by hardware of the processor 102 and some are set by microcode 144 of the processor 102. The SPROC 134 reads the SPROC status register 108 to determine the list of events that have occurred. One of the SPROC control registers 106 includes a bit corresponding to each action that the SPROC 134 should take in response to detecting one of the events specified in the SPROC status register 108. That is, a set of actions bits exists in the SPROC control register 106 for each possible event in the SPROC status register 108. In one embodiment, there are 16 action bits per event. In one embodiment, when the main processor 102 writes the SPROC status register 108 to indicate an event, this causes the SPROC 134 to be interrupted, in response to which the SPROC 134 reads the SPROC status register 108 to determine which events have occurred. Advantageously, this saves power by alleviating the need for the SPROC 134 to poll the SPROC status register 108. The SPROC status register 108 and SPROC control registers 106 can also be read and written by user programs that execute RDMSR and WRMSR instructions.

Figure 2:
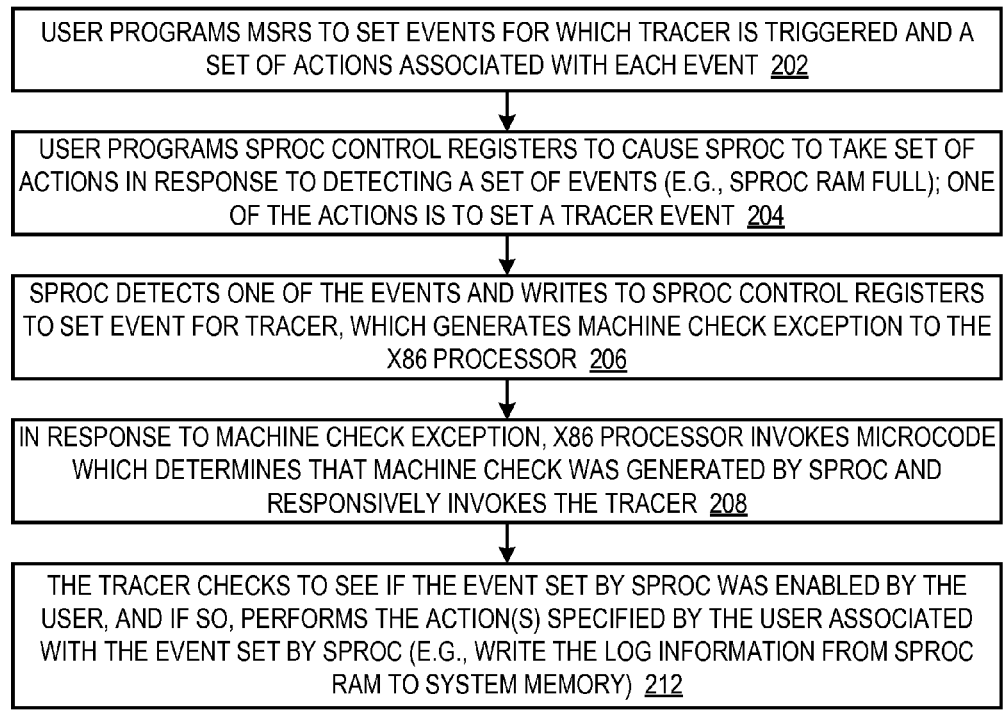
FIG. 2 is a flowchart illustrating operation of the microprocessor of FIG. 1.

The set of actions the SPROC 134 can perform in response to detecting an event include:
1. Write the log information to the SPROC RAM 136. For each of the log-writing actions, multiple of the action bits exist to enable the programmer to specify that only particular subsets of the log information should be written.
2. Write the log information from the SPROC RAM 136 to the SPI 138.
3. Write to one of the SPROC control registers 106 to set an event for the tracer 114. That is, the SPROC 134 can interrupt the processor 102 and cause the tracer 114 microcode to be invoked to perform a set of actions associated with the event. The actions are specified by the user (via WRMSR instructions) beforehand. In one embodiment, when the SPROC 134 writes the control register 106 to set the event, this causes the main processor 104 to take a machine check exception, and the machine check exception handler checks to see whether the tracer 114 is activated. If so, the machine check exception handler transfers control to the tracer 114. The tracer 114 reads the control register 106 and if the events set in the control register 106 are events that the user has enabled for the tracer 114, the tracer 114 performs the actions specified beforehand by the user associated with the events. The ability of the SPROC 134 to cause the tracer 114 to perform actions in response to an event detected by the SPROC 134 is illustrated by the flowchart of FIG. 2.

For example, the SPROC 134 can set an event to cause the tracer 114 to write the log information stored in the SPROC RAM 136 to system memory. This feature may be particularly advantageous in situations where the amount of log information selected to be saved is large (the amount of log information to be saved is programmable by the user via an MSR 104) and might overwhelm the slower SPI 138.

More specifically, there is a control bit in the SPROC control registers 106 that enables the SPROC 134 to set a special event for the tracer 114 that indicates the SPROC RAM 136 has filled up. In response, the tracer 114 reads the contents of SPROC RAM 136 and writes it to system memory, if the user has programmed tracer 114 to do so. Using the SPROC RAM 136 full event may improve the efficiency of the tracer 114, as illustrated by the following example. Assume the programmer wants to log all changes in the temperature. The programmer writes the SPROC control registers 106 to cause the SPROC 134 to: (1) log to the SPROC RAM 136 each temperature change event as it occurs, and (2) set an event to cause the tracer 114 to write the contents of SPROC RAM 136 to system memory each time a temperature change event occurs. However, this would be inefficient. Instead, the programmer can write the SPROC control registers 106 to cause the SPROC 134 to: (1) log to the SPROC RAM 136 each temperature change event as it occurs, and (2) set an event to cause the tracer 114 to write the contents of SPROC RAM 136 to system memory only when the SPROC RAM 136 fills up. This will result in many fewer interrupts of the processor 102 and less disruption to the actual programs running on the main processor 102, while at the same time providing the programmer effectively the same information about the temperature changes as by the less efficient method.
4. Write to a SPROC control register 106 to cause the microcode 144 of the processor 102 to branch to a microcode address specified by the SPROC 134. This is particularly useful if the microcode 144 of the processor 102 is in an infinite loop such that the tracer 114 will not be able to perform any meaningful actions, yet the processor 102 is still executing and retiring instructions, which means the processor hung event will not occur.

Figure 3:
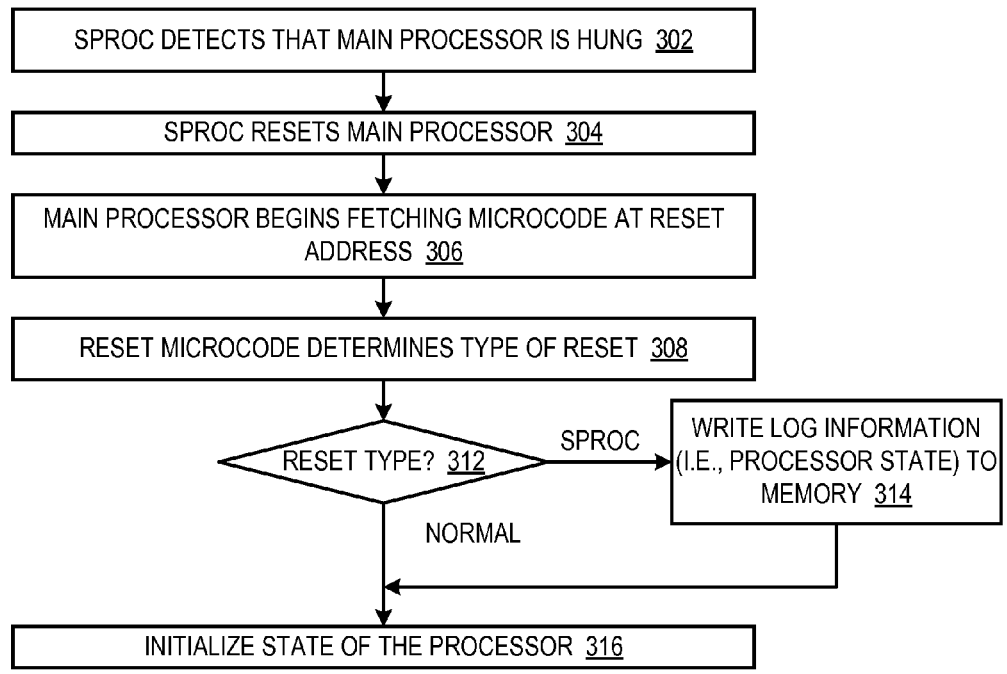
FIG. 3 is a flowchart illustrating operation of the microprocessor of FIG. 1.

5. Write to a SPROC control register 106 to cause the processor 102 to reset. As mentioned above, the SPROC 134 can detect that the main processor 102 is hung (i.e., has not retired any instruction for some programmable amount of time) and reset the main processor 102. The main processor 102 reset microcode 144 checks to see whether the reset was initiated by the SPROC 134 and, if so, advantageously writes the log information out to system memory before clearing it during the process of initializing the main processor 102. This feature is particularly advantageous because otherwise the processor 102 state information would be wiped out by the initialization normally performed by the reset microcode 144. Furthermore, if the processor 102 is hung (i.e., is not executing instructions), that means tracer 114 instructions are not running and therefore cannot save the log information; whereas, the SPROC 134 reset feature provides a way to obtain the log information even when the processor 102 is hung. Additionally, the SPROC 134 may read registers of the processor 102 to determine the state of various bus signals within processor 102, and whether the bus signals are changing. The bus signal information may be included in the log information, which may be particularly useful in the case of a hung processor 102 event. This is illustrated in the flowchart of FIG. 3.

6. Continuously log events. In this mode, rather than waiting to be interrupted by the main processor 102 of an event, the SPROC 134 spins in a loop checking the SPROC status register 108 and continuously logging information to the SPROC RAM 136 associated with the events indicated therein, and optionally additionally writing the log information to the SPI 138. This feature may also be used in conjunction with the ability of SPROC 134 to cause the tracer 114 to write the log information from the SPROC RAM 136 to system memory as the SPROC RAM 136 fills up.

Referring now to FIG. 2, a flowchart illustrating operation of the microprocessor 100 of FIG. 1 is shown. Flow begins at block 202.

At block 202, a user programs the MSRs 104 of FIG. 1 to set events for which tracer 114 is triggered and a set of actions associated with each of the events. Flow proceeds to block 204.

At block 204, the user programs the SPROC control registers 106 to cause the SPROC 134 to take a set of actions in response to detecting a set of events, such as the SPROC RAM 136 has become full (or filled to a specified fullness threshold). In particular, one of the actions the user may program the SPROC 134 to take is to set a tracer 114 event, as described above. Flow proceeds to block 206.

At block 206, the SPROC 134 detects one of the events programmed at block 204. The SPROC 134 responsively writes to the SPROC control registers 106 to set an event for tracer 114. This causes a machine check exception on the main processor 102. Flow proceeds to block 208.

At block 208, in response to the machine check exception generated at block 206, the main processor 102 invokes the microcode 144, which determines that a machine check exception was generated by the SPROC 134. The microcode 144 responsively invokes tracer 114. Flow proceeds to block 212.

At block 212, tracer 114 checks to see if the event set by the SPROC 134 was enabled by the user at block 202. If so, tracer 114 performs the actions specified by the user at block 202 associated with the event set by SPROC 134, such as to write the log information from the SPROC RAM 136 to system memory. Flow ends at block 212.

Referring now to FIG. 3, a flowchart illustrating operation of the microprocessor 100 of FIG. 1 is shown. Flow begins at block 302.

At block 302, the SPROC 134 detects that the main processor 102 is hung, i.e., that the main processor 102 has not retired an instruction for a specified amount of time, as discussed above. Flow proceeds to block 304.

At block 304, in response to detecting the main processor 102 is hung at block 302, the SPROC 134 resets the main processor 102, as discussed above. Flow proceeds to block 306.

At block 306, in response to the reset performed at block 304, the main processor 102 begins fetching and executing the reset microcode 144. Flow proceeds to block 308.

At block 308, the reset microcode 144 determines the type of reset that occurred. Flow proceeds to decision block 312.

At decision block 312, if the reset microcode 144 determines that the reset type is a normal reset (e.g., a reset generated by the external reset pin or a power-up reset), flow proceeds to block 316; however, if the reset microcode 144 determines that the reset type is an SPROC 134 reset, such as performed at block 304, flow proceeds to block 314.

At block 314, the reset microcode 144 writes the log information to memory. As discussed above, the log information may include state of main processor 102, state of the processor bus signals, and/or log information about events that previously occurred regarding the main processor 102, such as processor 102 hangs, uncacheable loads, temperature changes, performance state change requests from the OS, self-initiated performance state changes, internal timer expirations, snoop hits to modified cache lines, temperature, voltage, or clock ratios exceeding programmable ranges, and external trigger signal assertions. Flow proceeds to block 316.

At block 316, the reset microcode 144 continues its initialization function to initialize the main processor 102 such that the main processor 102 can begin fetching and executing user program instructions from memory. Flow ends at block 316.

Figure 4:
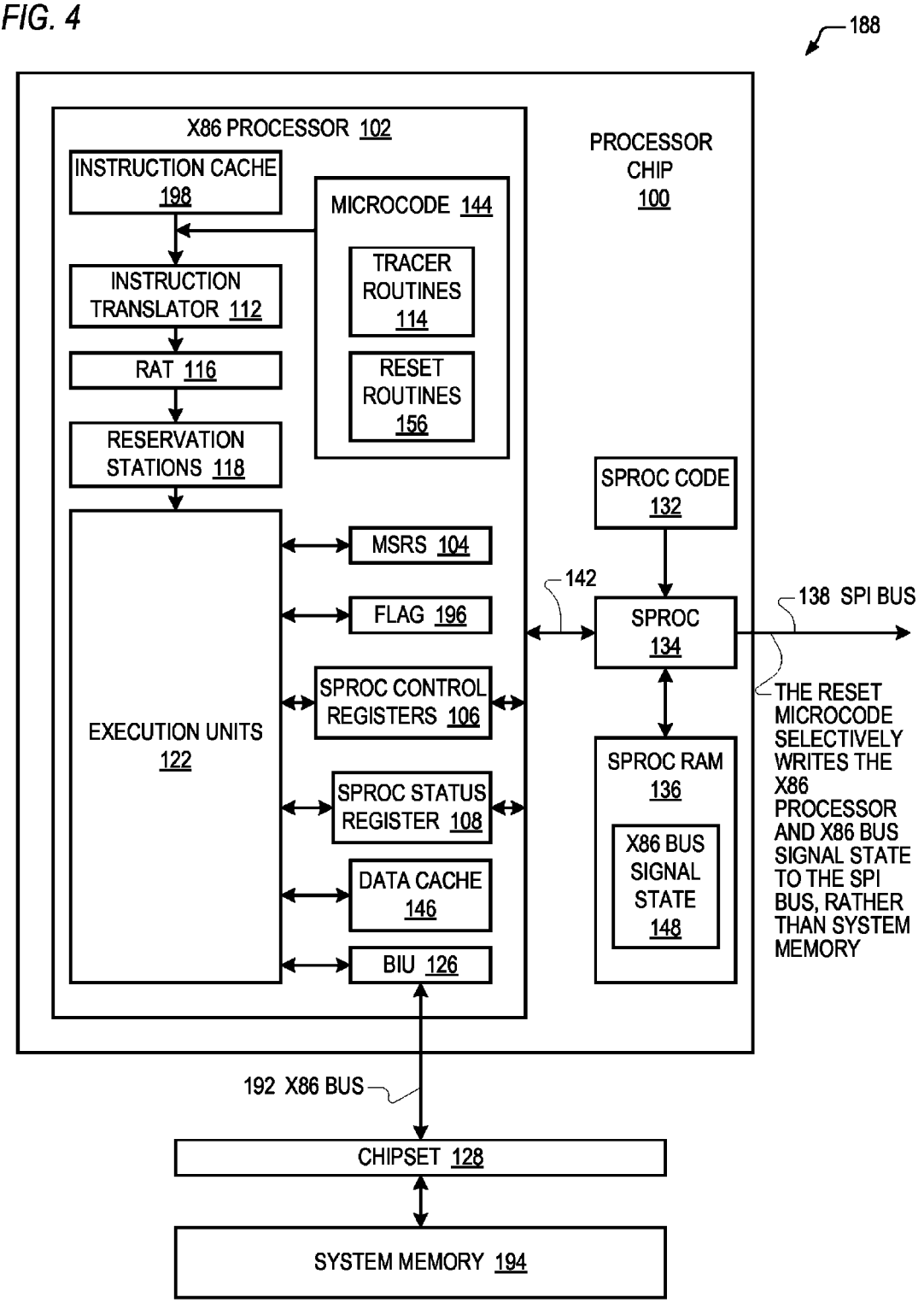
FIG. 4 is a block diagram illustrating a computer system.

Referring now to FIG. 4, a block diagram illustrating a computer system 188 is shown. The computer system 188 includes a processor chip 100, or microprocessor integrated circuit 100, coupled to a system memory 194 via a chipset 128 that is coupled to the microprocessor 100 by a processor bus 192. In one embodiment, the processor bus 192 is an x86 processor bus.

The microprocessor 100 is similar to the microprocessor 100 of FIG. 1. However, the embodiment of FIG. 4 explicitly shows the reset routines 156 of the microcode ROM of the microcode unit 144. Operation of the tracer 114 and reset routines 156 will be described in more detail below with respect to FIG. 5. Additionally, the embodiment of FIG. 4 explicitly shows a data cache 146 of the main processor 102 coupled to the execution units 122. Still further, the main processor 102 includes a non-user-addressable storage element 196 for storing a flag. According to one embodiment, storage element 196 is not cleared by the reset that occurs at block 506 of FIG. 5, which is described below. More specifically, the storage element 196 is cleared by a power-on reset of the chip 100, but is not affected by a non-power-on reset of the chip 100, such as a reset initiated by assertion of a signal on a reset input to the chip 100 or by a self-reset. Finally, the SPROC RAM 136 stores x86 bus signal state 148, as described in more below with respect to FIG. 2. As described above, the SPI bus 138 is an external bus of the chip 188, which SPROC 134 uses to communicate information, namely debug information, to devices external to the chip 188. Importantly, SPROC 134 uses the SPI bus 138 to communicate debug information to devices external to the chip 188 when the debug information cannot be written to the system memory 194, as described herein.

It has been observed that there are classes of design bugs that cause the processor bus 192 between the processor 100 and the chipset 128 to be hung, such that the tracer 114 cannot write the processor state to system memory 194. Nevertheless, it would be quite useful to know the processor state at the time of the bus 192 hang. It would also be useful to know the state of the bus 192 when it is hung.

To obtain these benefits, when SPROC 134 detects a hung processor 102 condition, which potentially indicates a hung bus 192 condition, it saves the processor bus 192 signal state to its own internal memory 136 and resets the main processor 102. When the main processor 102 comes out of reset, its reset microcode 156 writes the main processor 102 state and saved bus 192 signal state either to the system memory 194 or to the SPI bus 138, depending upon a user-programmable setting, as described below with respect to FIG. 5.

Figure 5:
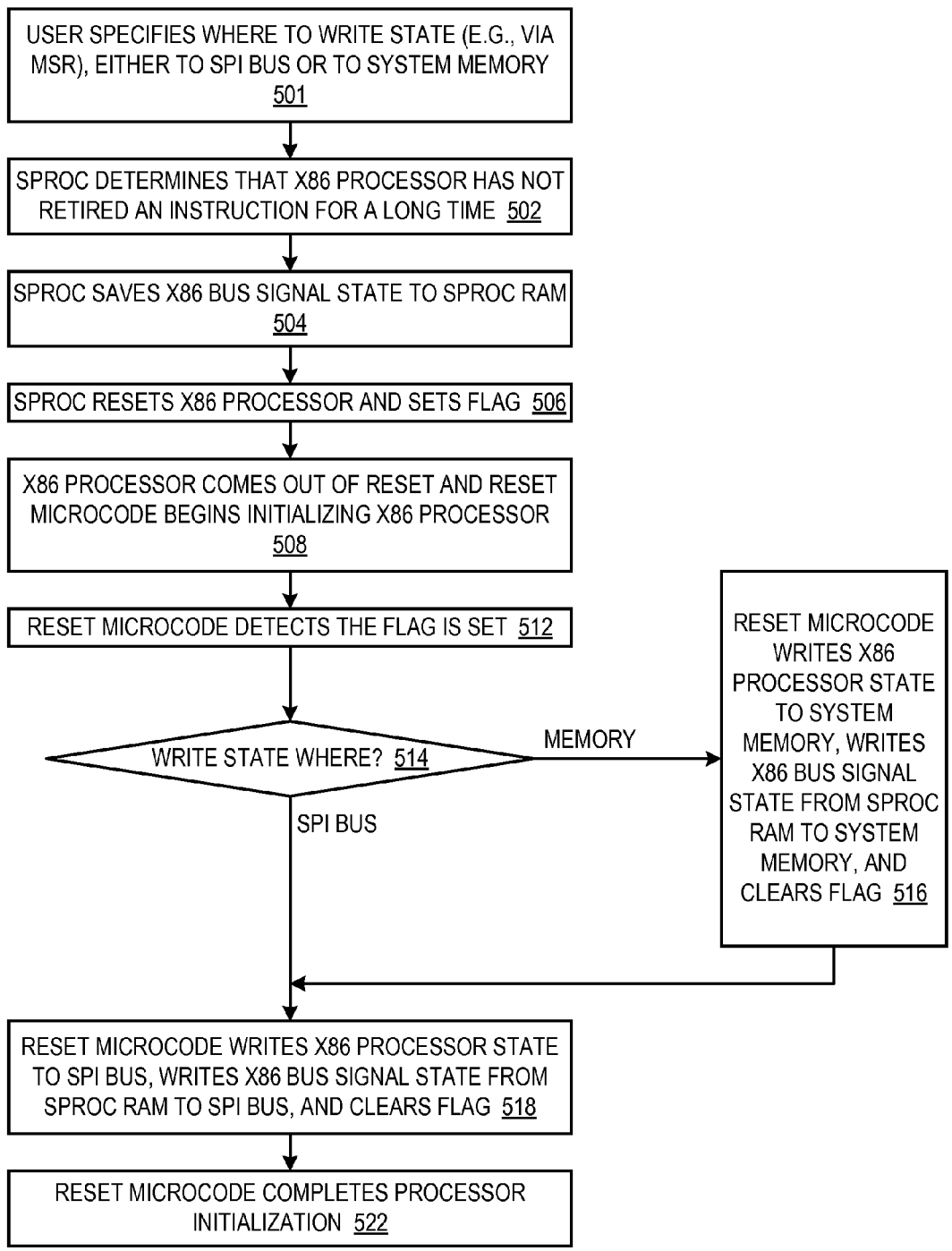
FIG. 5 is a flowchart illustrating operation of the microprocessor of the computer system FIG. 4.

Referring now to FIG. 5, a flowchart illustrating operation of the system 188 of FIG. 1 is shown. Flow begins at block 501.

At block 501, the user specifies where to write the x86 processor 102 state and the x86 bus 192 state, namely, either to system memory 194 or to the SPI bus 138. In one embodiment, the user specifies the destination of the state by writing a bit in one of the MSRs 104. Additionally, the user specifies how much x86 processor 102 state to write. For example, the user may specify a minimal amount of state, e.g., only the register set of the x86 processor 102, or a maximal amount of state, e.g., the register set and the state of all the cache memories of the x86 processor 102. Flow proceeds to block 502.

At block 502, SPROC 134 determines that the x86 processor 102 is hung. More specifically, SPROC 134 determines that the x86 processor 102 has not retired any instructions for a predetermined amount of time. In one embodiment, SPROC 134 makes this determination by detecting that a counter has overflowed. The counter increments each clock cycle of the x86 processor 102 and is reset to a predetermined value less than its maximum value each time the x86 processor 102 retires an instruction. There may be many reasons why the x86 processor 102 has not retired an instruction for the predetermined amount of time. One reason is that a design bug in the x86 processor 102 has manifested such that the x86 processor 102 and the chipset 128 are in a situation such that the x86 bus 192 is hung, i.e., the x86 processor 102 and the chipset 128 are each waiting on the other to perform an action on the x86 bus 192. Flow proceeds to block 504.

At block 504, SPROC 134 saves the x86 bus 192 signal state 148 to the SPROC RAM 136 in response to detecting the hung x86 bus 192 condition at block 502. More specifically, SPROC 134 reads a register in the BIU 126 to determine the x86 bus signal state 148. Advantageously, SPROC 134 saves the x86 bus signal state 148 before resetting the x86 processor 102 (at block 506), since resetting the x86 processor 102 resets the BIU 126, which may cause the state of the x86 bus 192 signals to be lost. Advantageously, the x86 bus signal state 148 in the SPROC RAM 136 may later be written to system memory 194 and/or the SPI bus 138 for use in debugging, as described herein. The SPROC RAM 136 is not accessible by user programs. That is, only SPROC 134 and the microcode 144 routines can access the SPROC RAM 136. Thus, advantageously, this prevents the x86 bus signal state 148 in the SPROC RAM 136 from being overwritten by user programs. Flow proceeds to block 506.

At block 506, SPROC 134 resets the x86 processor 102 and sets the flag in the storage element 196. It is noted that the reset of the x86 processor 102 at block 506 may not restore the x86 bus 192 to a non-hung state. In particular, the reset of the x86 processor 102 does not cause a reset of the chipset 128, which may still be confused by the previous behavior of the x86 processor 102 and not be accepting any transactions on the x86 bus 192 by the x86 processor 102. For this reason, the reset microcode 156 advantageously selectively writes the x86 processor 102 state and x86 bus signal state 148 to the SPI bus 138, as described herein, rather than to the system memory 194. Flow proceeds to block 508.

At block 508, the reset microcode 156 runs because the x86 processor 102 was reset at block 506. The reset microcode 156 begins initializing the x86 processor 102. Flow proceeds to block 512.

At block 512, as part of the initialization sequence, the reset microcode 156 detects that the flag 196 is set. Flow proceeds to decision block 514.

At block 514, in response to detecting the flag 196 is set at block 512, the reset microcode 156 examines the MSR 104 bit written at block 501 to determine whether to write the state to system memory 194 or to the SPI bus 138. If the MSR 104 bit indicates system memory 194, flow proceeds to block 516; if the MSR 104 bit indicates SPI bus 138, flow proceeds to block 518.

At block 516, the reset microcode 156 writes the x86 processor 102 state to system memory 194. Additionally, the reset microcode 156 writes the x86 bus signal state 148 from the SPROC RAM 136 to the system memory 194. In one embodiment, the reset microcode 156 writes the state to a location in system memory 194 that was specified by the user in an MSR 104. Additionally, the reset microcode 156 clears the flag 196. Flow proceeds to block 522.

At block 518, the reset microcode 156 writes the x86 processor 102 state to the SPI bus 138. Additionally, the reset microcode 156 writes the x86 bus signal state 148 from the SPROC RAM 136 to the SPI bus 138, which was saved at block 504. Additionally, the reset microcode 156 clears the flag 196. This is advantageous because it provides an alternate way for the debugger to get the state information in situations where the state cannot be written to system memory 194. Flow proceeds to block 522.

At block 522, the reset microcode 156 completes the initialization of the x86 processor 102. It is noted that the MSR 104 value written at block 501 (described above) is preserved through the reset of the x86 processor 102 by SPROC 134 at block 506 (described above). More specifically, the reset microcode 156 does not initialize the MSR 104 before performing the operations at blocks 512 through 518. Flow ends at block 522.

Although embodiments have been described in the context of an x86 architecture microprocessor, other embodiments are contemplated in which the main processor is of a different instruction set architecture.

While various embodiments of the present invention have been described herein, it should be understood that they have been presented by way of example, and not limitation. It will be apparent to persons skilled in the relevant computer arts that various changes in form and detail can be made therein without departing from the scope of the invention. For example, software can enable, for example, the function, fabrication, modeling, simulation, description and/or testing of the apparatus and methods described herein. This can be accomplished through the use of general programming languages (e.g., C, C++), hardware description languages (HDL) including Verilog™ HDL, VHDL, and so on, or other available programs. Such software can be disposed in any known computer usable medium such as magnetic tape, semiconductor, magnetic disk, or optical disc (e.g., CD-ROM, DVD-ROM, etc.), a network, wire line, wireless or other communications medium. Embodiments of the apparatus and method described herein may be included in a semiconductor intellectual property core, such as a microprocessor core (e.g., embodied in HDL) and transformed to hardware in the production of integrated circuits. Additionally, the apparatus and methods described herein may be embodied as a combination of hardware and software. Thus, the present invention should not be limited by any of the exemplary embodiments described herein, but should be defined only in accordance with the following claims and their equivalents. Specifically, the present invention may be implemented within a microprocessor device which may be used in a general purpose computer. Finally, those skilled in the art should appreciate that they can readily use the disclosed conception and specific embodiments as a basis for designing or modifying other structures for carrying out the same purposes of the present invention without departing from the scope of the invention as defined by the appended claims.

We claim:

1. A microprocessor integrated circuit, comprising:
   first and second processors;
   an internal memory, accessible by the first and second processors; and
   a bus interface unit, configured to interface to a bus external to the microprocessor integrated circuit for providing access to a memory external to the microprocessor integrated circuit, wherein the bus interface unit, external bus, and external memory are accessible by the second processor but are inaccessible by the first processor;
   wherein the first processor is configured to write debug information to the internal memory;
   wherein the first processor is further configured to detect an event and to provide a notification of the event to the second processor;
   wherein the second processor is coupled to the bus interface unit and is configured to execute microcode in response to the event notification received from the first processor, wherein the microcode is configured to read the debug information from the internal memory and to write the debug information to the external memory via the bus interface unit and external bus for use in debugging the second processor;
   wherein the second processor is configured to execute user programs and the microcode, and wherein the first processor is configured to execute only programs developed by the manufacturer of the microprocessor integrated circuit.

2. The microprocessor integrated circuit of claim 1, wherein the event detected by the first processor is that the internal memory has become at least a predetermined amount full of the debug information written there by the first processor.

3. The microprocessor integrated circuit of claim 1, wherein the internal memory is non-accessible by user programs executing on the second processor.

4. The microprocessor integrated circuit of claim 1, wherein the debug information comprises information regarding temperature of the second processor.

5. The microprocessor integrated circuit of claim 1, wherein the debug information comprises information regarding operating voltage of the second processor.

6. The microprocessor integrated circuit of claim 1, wherein the debug information comprises information regarding operating frequency of the second processor.

7. The microprocessor integrated circuit of claim 1, wherein the debug information comprises information regarding memory load operations from an uncacheable memory region.

8. The microprocessor integrated circuit of claim 1, wherein the debug information comprises information regarding snoop operations that hit a modified line of a cache memory of the second processor.

9. The microprocessor integrated circuit of claim 1, wherein the debug information comprises information regarding requests by an operating system executing on the second processor to change a performance state of the second processor.

10. The microprocessor integrated circuit of claim 1, wherein the debug information comprises information regarding a change of a performance state of the second processor initiated by the second processor itself.

11. The microprocessor integrated circuit of claim 1, wherein the event is user-programmable via a program executing on the second processor.

12. The microprocessor integrated circuit of claim 1, wherein the first and second processors are architecturally asymmetric.

13. The microprocessor integrated circuit of claim 1, wherein the first processor is interruptible by the event independent of an instruction execution state of the second processor.

14. The microprocessor integrated circuit of claim 1, wherein the microcode is configured to selectively write the debug information to an external bus coupled to the first processor for use in debugging the second processor, wherein the external bus is non-architectural to the second processor and is distinct from an architectural bus of the second processor.

15. A method for debugging a microprocessor integrated circuit comprising first and second processors and an internal memory accessible by the first and second processors, the microprocessor integrated circuit being coupled to an external memory by an external bus, the method comprising:
   writing debug information, by the first processor, to the internal memory;
   detecting an event and providing a notification of the event to the second processor, by the first processor;
   executing microcode, by the second processor, in response to the event notification received from the first processor; and
   reading the debug information from the internal memory and to writing it to the external memory for use in debugging the second processor, wherein said reading and writing are performed by the microcode;
   wherein said writing the debug information to the external memory comprises causing a bus interface unit, coupled to the second processor, to write the debug information on the external bus to the external memory, wherein the bus interface unit, external bus, and external memory are inaccessible by the first processor;
   wherein the second processor is configured to execute user programs and the microcode, and wherein the first processor is configured to execute only programs developed by the manufacturer of the microprocessor integrated circuit.

16. The method of claim 15, wherein said detecting the event comprises detecting that the internal memory has become at least a predetermined amount full of the debug information written there by the first processor.

17. The method of claim 15, wherein the internal memory is non-accessible by user programs executing on the second processor.

18. The method of claim 15, wherein the debug information comprises information regarding temperature of the second processor.

19. The method of claim 15, wherein the debug information comprises information regarding operating voltage of the second processor.

20. The method of claim 15, wherein the debug information comprises information regarding operating frequency of the second processor.

21. The method of claim 15, wherein the debug information comprises information regarding memory load operations from an uncacheable memory region.

22. The method of claim 15, wherein the debug information comprises information regarding snoop operations that hit a modified line of a cache memory of the second processor.

23. The method of claim 15, wherein the debug information comprises information regarding requests by an operating system executing on the second processor to change a performance state of the second processor.

24. The method of claim 15, wherein the debug information comprises information regarding a change of a performance state of the second processor initiated by the second processor itself.

25. The method of claim 15, wherein the event is user-programmable via a program executing on the second processor.

26. The method of claim 15, wherein the first and second processors are architecturally asymmetric.

27. The method of claim 15, wherein the first processor is interruptible by the event independent of an instruction execution state of the second processor.

28. The method of claim 15, further comprising:
selectively writing the debug information to an external bus coupled to the first processor for use in debugging the second processor, wherein the external bus is non-architectural to the second processor and is distinct from an architectural bus of the second processor, wherein said selectively writing is performed by the microcode.

29. A computer program product for use with a computing device, the computer program product comprising:
a computer usable non-transitory storage medium, having computer readable program code embodied in said medium, for specifying a microprocessor integrated circuit, the computer readable program code comprising:
first program code for specifying first and second processors;
second program code for specifying an internal memory, accessible by the first and second processors; and
third program code for specifying a bus interface unit, configured to interface to a bus external to the microprocessor integrated circuit for providing access to a memory external to the microprocessor integrated circuit, wherein the bus interface unit, external bus, and external memory are accessible by the second processor but are inaccessible by the first processor;
wherein the first processor is configured to write debug information to the internal memory;
wherein the first processor is further configured to detect an event and to provide a notification of the event to the second processor;
wherein the second processor is coupled to the bus interface unit and is configured to execute microcode in response to the event notification received from the first processor, wherein the microcode is configured to read the debug information from the internal memory and to write the debug information to the external memory via the bus interface unit and external bus for use in debugging the second processor;
wherein the second processor is configured to execute user programs and the microcode, and wherein the first processor is configured to execute only programs developed by the manufacturer of the microprocessor integrated circuit.

30. The computer program product of claim 29, wherein the computer usable non-transitory storage medium is selected from the set of a disk, tape, or other magnetic, optical, or electronic storage medium and.

* * * * *